United States Patent [19]

Frock

[11] 3,783,155

[45] Jan. 1, 1974

[54] SINTERED CUPRIC OXIDE MASSES

[75] Inventor: Brian G. Frock, Dayton, Ohio

[73] Assignee: The National Cash Register Company, Dayton, Ohio

[22] Filed: Dec. 3, 1971

[21] Appl. No.: 204,706

[52] U.S. Cl. ............... 265/65, 106/286, 106/287 R, 156/411, 252/512, 264/56

[51] Int. Cl. ............... B29c 6/00

[58] Field of Search ............... 264/56, 65; 106/286, 106/287 R

[56] References Cited

UNITED STATES PATENTS

| | | | |
|---|---|---|---|
| 2,021,520 | 11/1935 | Reichmann | 264/56 |
| 2,001,134 | 5/1935 | Hardy | 264/56 |
| 3,704,467 | 11/1972 | Frock | 340/173 CH |

*Primary Examiner*—M. J. Welsh
*Attorney*—E. Frank McKinney et al.

[57] ABSTRACT

Compacted, sintered cupric oxide masses are disclosed. The masses are prepared from copper oxide powder under high pressure followed by heating at high temperatures. Various regions of the mass can be switched to an electrically conductive copper state. This invention could easily be used for the storage of electrical information as well as for optical memory.

6 Claims, No Drawings

SINTERED CUPRIC OXIDE MASSES

This invention relates to a compacted, sintered mass of cupric oxide and to a process for producing this mass. In another aspect, this invention relates to a compacted, sintered mass of cupric oxide having selected regions of differing electrical conductivity.

Thin, copper films and processes for their production are known in the art. U.S. Pat. No. 3,704,467, issued Nov. 28, 1972, discloses thin, cupric oxide films evaporated onto glass substrates. U.S. Pat. Application Ser. No. 72,235, filed Sept. 14, 1970, now abandoned, discloses thin, cupric oxide films fire glazed onto tile substrates.

The cupric oxide exhibits a bistable switching phenomenon in that the cupric oxide can be switched from a dark-colored electrically non-conductive state to a copper-colored electrically conductive state. This switching can be reversed and repeated indefinitely. Various methods of switching are described in the previously mentioned patent applications. If desired, selected portions of the cupric oxide can be switched rather than the entire sample.

An example of selected switching would be the development of electrically conductive copper circuitry or patterns on the cupric oxide surface. Often, these copper films or circuits require the presence of a substrate such as glass or ceramic tile. This invention is an effort to get the electrically conductive copper away from the substrate.

Compacted, sintered masses of cupric oxide now have been formed. The masses, often in the form of a disc, are prepared from powdered copper oxide. The powder is placed in a mold and subjected to high pressure at room temperature until compaction is complete. After the pressure is released, the mass is removed from the mold and heated in air at high temperatures to accomplish sintering. Once sintering is complete, the mass is cooled. Various regions of the mass then can be switched to the electrically conductive copper state.

Accordingly, an object of this invention is to provide compacted, sintered masses of cupric oxide.

Another object of this invention is to provide a process for producing compacted, sintered masses of cupric oxide.

Still another object of this invention is to provide compacted, sintered cupric oxide masses having selected regions of electrically conductive copper.

Other objects, aspects and advantages of this invention will be apparent to one skilled in the art from the following specification and appended claims.

From one viewpoint, this invention can be considered a substrate for microcircuitry wherein selected regions can be converted to electrically conductive copper paths while the remaining portion of the cupric oxide mass is insulating, i.e., electrically non-conductive. From another viewpoint, this invention can be used for the storage of electrical information. Copper paths on the cupric oxide disc could easily be formed into the two digits of the binary system (1 or 0) and the discs then could be used in components of a computer system. Aside from microcircuitry and electrical memory, this invention also could be used for optical memory and for display devices as the optical contrast between the drak-colored cupric oxide state and the copper-colored copper state is more than sufficient for these purposes.

The cupric oxide masses of this invention are prepared from cuprous oxide, cupric oxide or mixtures thereof. Up to 10 weight percent of this starting material can be comprised of other oxides such as sodium oxide, potassium oxide, lithium oxide, boron oxide ($B_2O_3$), alumina ($Al_2O_3$), lead oxide (PbO), silica, and the like and mixtures thereof. Generally, the copper oxide starting material is in powder form. If desired, the powder can be ground thoroughly and ball-milled in a solvent such as xylene. Once the powder is dried, it is placed in an airtight container for storage.

The copper oxide powder is placed in a die. Usually 0.1 to 1.0 grams of powder are employed. The powder is evenly distributed in the die prior to insertion of the plunger. The die is placed on a press and brought up to the desired pressure. At room temperature, the powder samples are subjected to a pressure ranging from 10,000 to 100,000 p.s.i. for a time ranging up to 5 minutes. Preferably, the pressure ranges from 25,000 to 85,000 p.s.i. and the time ranges up to 2 minutes. After the pressure is relaxed, the sample is removed from the die. Disc-shaped samples resembling a thick dime are produced.

The samples then are sintered by heating in air at temperatures ranging from 600° to 1,000° C at atmospheric pressure for times ranging from 30 minutes to 5 hours. Preferably, the sintering is carried out at temperatures ranging from 750° to 1,000° C and times ranging from 1 to 3 hours.

The compacted, sintered mass of cupric oxide can be cooled by one of two methods. Preferably, the samples slowly are cooled over a period of time ranging up to 24 hours. This is accomplished by retaining the sample in the furnace and allowing it to cool down with the furnace on its own accord. Alternatively, the samples can be quickly quenched by immediate exposure to air at room temperature.

Samples thus prepared are mechanically sturdy, gray-black in color and electrically non-conductive. The samples range in thickness from 0.5 to 3.0 millimeters.

These cold pressing and hot sintering properties in combination with employing $Cu_2O$ powder, CuO powder or a mixture thereof can be used to produce cupric oxide masses having a wide variety of properties. For example, CuO and $Cu_2O$ compact to about the same extent in the green state (not sintered), yet $Cu_2O$ compacts more upon sintering. $Cu_2O$ gains in mass as it oxidizes to CuO during sintering, while shrinking in the process resulting in denser samples. Therefore, by employing $Cu_2O$ powder as a starting material and by increasing the time and temperature of sintering, denser masses are obtained.

Selected areas, zones or regions of the compacted, sintered cupric oxide masses of this invention now can be switched to electrically conductive copper by the various methods of switching described in previously mentioned U. S. Pat. No. 3,704,467 and now abandoned U.S. Pat. Ser. No. 72,235. A hydrocarbon gas oxygen torch or laser beam in a reducing atmosphere can be utilized for this purpose. The use of a laser beam is especially useful in that it permits the development of very small electrical circuitry on the cupric oxide masses of this invention. Not only can surface patterns of copper be developed, but interconnected paths can be developed by thermal switching through the entire thickness of the mass. Such a cross-over interconnected circuit could be used in multi-layer circuit boards.

The advantages of this invention are further illustrated by the following examples. The materials and other specific conditions are presented as being typical and should not be construed to limit the invention unduly.

EXAMPLE I

Stock samples of CuO or $Cu_2O$ powder, usually 0.3 to 0.7 grams, were placed in a cylindrical steel die having a diameter of 0.5 inches. The samples were taken from reagent grade stock bottles distributed by the J. T. Baker Chemical Corporation. The powder was evenly distributed across the lower plunger before the upper plunger was inserted. The die was placed on a laboratory press and the samples were pressed for 1 minute at 35,000 p.s.i. The pressure was relaxed and the samples were removed from the die. To determine densities, diameter, mass and thickness measurements were taken on the green (unsintered) samples.

The samples then were sintered in air at temperatures ranging from 750° to 1,000° C for one hour. This was followed by slow cooling of the samples, for approximately 20 hours, to room temperature. The cooling was accomplished by leaving the samples in the furnace for that time period. Densities for the sintered samples were determined in the same manner as for the green samples.

The samples were gray-black in color, disc-shaped and substantially non-conductive. The samples were mechanically sturdy and could be handled without any breaking of the disc. The densities and sintering temperature for each sample is given in the following Table.

TABLE

| Starting Material Composition | Sintering Temp., °C | Density, g/cm³** Green | Sintered |
|---|---|---|---|
| CuO | 750 | 4.43 | 4.44 |
| CuO | 800 | 4.43 | 4.45 |
| CuO | 850 | 4.43 | 4.47 |
| CuO | 900 | 4.45 | 4.46 |
| CuO | 950 | 4.44 | 4.39 |
| CuO | 1000 | 4.45 | 4.45 |
| $Cu_2O$ | 750 | 4.33 | 5.38 |
| $Cu_2O$ | 800 | 4.31 | 5.37 |
| $Cu_2O$ | 850 | 4.35 | 5.45 |
| $Cu_2O$ | 900 | 4.27 | 5.47 |
| $Cu_2O$ | 950 | 4.39 | 5.53 |
| $Cu_2O$ | 1000 | 4.35 | 5.52 |
| $Cu_2O$ | 1000* | 4.33 | 5.62 |

* In this sample, sintering was carried out at 1000° C for 2 hours.
** Both the green and sintered densities in the table are mean values.

Clearly, by employing $Cu_2O$ powder as a starting material and by increasing the time and temperature of sintering, denser cupric oxide discs are obtained. Samples sintered at 1,000° C for a given time period yielded the greatest densification. For those samples sintered for one hour at this temperature the mean density was 5.52 g/cm³, while for those sintered for 2 hours the mean density was 5.62 g/cm³. These values correspond to 86 percent and 88 percent, respectively, of the theoretical density of CuO. CuO must be used as the standard because the $Cu_2O$ oxidizes completely to CuO upon sintering.

EXAMPLE II

Three cupric oxide discs prepared in Example I were selective switched according to the following procedure. The densities of these samples were: 5.38 g/cm³; 5.45 g/cm³ and 5.53 g/cm³.

A laser beam was used in conjunction with liquid alcohol to produce long electrically conductive paths by reduction of the cupric oxide to copper. The light was focused on a spot of the sample. When the area reached a sufficient temperature, the alcohol caused the spot to be reduced to nearly pure copper. This method of switching was used to write thin electrically conductive lines of nearly pure copper on the surfaces of the discs.

Although this invention has been described in considerable detail, it must be understood that such detail is for the purposes of illustration only and that many variations and modifications can be made by one skilled in the art without departing from the scope and spirit thereof.

What is claimed is:

1. A process for preparing cupric oxide masses comprising sequentially:

a. providing a quantity of copper oxide powder;
b. subjecting the powder of step (a) to a pressure ranging from 10,000 to 100,000 p.s.i. at room temperature for a time ranging up to 5 minutes;
c. releasing the pressure of step (b); and
d. subjecting the resulting compacted mass to a temperature ranging from 600° to 1,000° C in air at atmospheric pressure for a time ranging from 30 minutes to 5 hours.

2. A process according to claim 1 comprising the additional step of:

e. cooling the resulting compacted, sintered mass of step (d).

3. A process according to claim 1 wherein the pressure of step (b) ranges from 25,000 to 85,000 and the time of step (b) ranges up to 2 minutes.

4. A process according to claim 1 wherein the temperature of step (d) ranges from 750° to 1,000° C and the time of step (d) ranges from 1 to 3 hours.

5. A process according to claim 2 wherein the cooling of step (e) is carried out slowly over a period of time ranging up to 24 hours.

6. A process according to claim 1 wherein the copper oxide powder of step (a) is cupric oxide, cuprous oxide or a mixture thereof.

* * * * *